(12) United States Patent
Massinger

(10) Patent No.: US 6,223,612 B1
(45) Date of Patent: May 1, 2001

(54) FLYWHEEL MOTOR TRANSMISSION

(76) Inventor: Heinz Massinger, 40 Sunset Ter., Adirondack, NY (US) 17808

( * ) Notice: Subject to any disclaimer, the term of this patent is extended or adjusted under 35 U.S.C. 154(b) by 0 days.

(21) Appl. No.: 09/301,368

(22) Filed: Apr. 20, 1999

Related U.S. Application Data

(60) Provisional application No. 60/082,455, filed on Apr. 20, 1998.

(51) Int. Cl.[7] .................................................. F16H 27/02
(52) U.S. Cl. .............................. 74/127; 74/130; 123/53.4
(58) Field of Search .............................. 74/126, 127, 128, 74/130; 123/53.4, 53.6

(56) References Cited

U.S. PATENT DOCUMENTS

| | | | | |
|---|---|---|---|---|
| 216,537 | * | 6/1879 | Skinner | 74/126 X |
| 422,539 | * | 3/1890 | Quinn | 74/126 X |
| 849,506 | * | 4/1907 | Shadall | 74/126 X |
| 1,052,521 | * | 2/1913 | Scott | 74/126 X |
| 1,762,614 | * | 6/1930 | Delfino | 123/53.4 |
| 1,920,765 | * | 8/1933 | Rasch | 74/126 X |
| 2,383,468 | * | 8/1945 | Hawkins | 123/53.4 |
| 3,105,162 | * | 9/1963 | Stevenson | 74/126 X |
| 3,211,012 | * | 10/1965 | Murai | 74/126 X |
| 3,267,917 | * | 8/1966 | Bargero | 123/53.4 |
| 3,608,530 | * | 9/1971 | Wenzel | 123/53.4 |
| 3,999,523 | * | 12/1976 | Andreen | 123/53.4 X |
| 4,408,577 | * | 10/1983 | Killian | 123/53.6 |
| 4,708,099 | * | 11/1987 | Ekker | 123/53.4 |
| 5,025,759 | * | 6/1991 | Wenzel et al. | 123/53.4 |
| 5,050,384 | * | 9/1991 | Crockett | 123/53.4 X |

* cited by examiner

Primary Examiner—David A. Bucci
Assistant Examiner—Colby Hansen
(74) Attorney, Agent, or Firm—Gene Scott-Patent Law & Venture Group

(57) ABSTRACT

Motion of an apparatus having reciprocal linear motion of an input member is converted into alternating rotary motion of a drive member such as a drive shaft or a drive gear. Additionally, a system is taught which uses linear motion, oscillating motion and rotational motion or any two or three with conversions and is adapted for using kinetic and electrical energy sources together and interchangeably. The system may be adapted for vehicular use. In one embodiment a two-cycle internal combustion engine is used in combination with the apparatus.

5 Claims, 6 Drawing Sheets

FLYWHEEL MOTOR TRANSMISSION

This application claims benefit of Provisional Ser. No. 60/082,455 filed Apr. 20, 1998.

BACKGROUND OF THE INVENTION

1. Field of the Invention

The present invention relates to a device for converting reciprocal linear motion to continuous rotary motion. The device is particularly usefull for converting reciprocal motion of a piston engine arrangement into rotary motion of an output shaft for a vehicle.

2. Description of the Prior Art

U.S. Pat. Nos. 2,578,559; 3,347,478; 3,465,602; 3,572,140 and 3,661,019 disclose devices for converting reciprocal motion to rotary motion or vice versa. U.S. Pat. No. 2,578,559 discloses a flywheel, which is said to maintain a nearly constant rotational shaft velocity in a reciprocal to rotary conversion device having only one power stroke. U.S. Pat. No. 4,282,442 discloses a basic conversion machine in two embodiments which are used in the present disclosure.

SUMMARY OF THE INVENTION

In a device in accordance with the present invention, the reciprocal linear motion of an input member is converted into alternating rotary motion of a drive member such as a drive shaft or a drive gear. U.S. Pat. No. 4,282,442 issued on Aug. 4, 1981 describes such a device and is therefore incorporated by reference into the present application in support of the embodiments herein disclosed for detailed teachings. The present invention further teaches certain advances in the art within several embodiments as described in detail and claimed in the following.

DETAILED DESCRIPTION OF THE INVENTION

Figure 1:
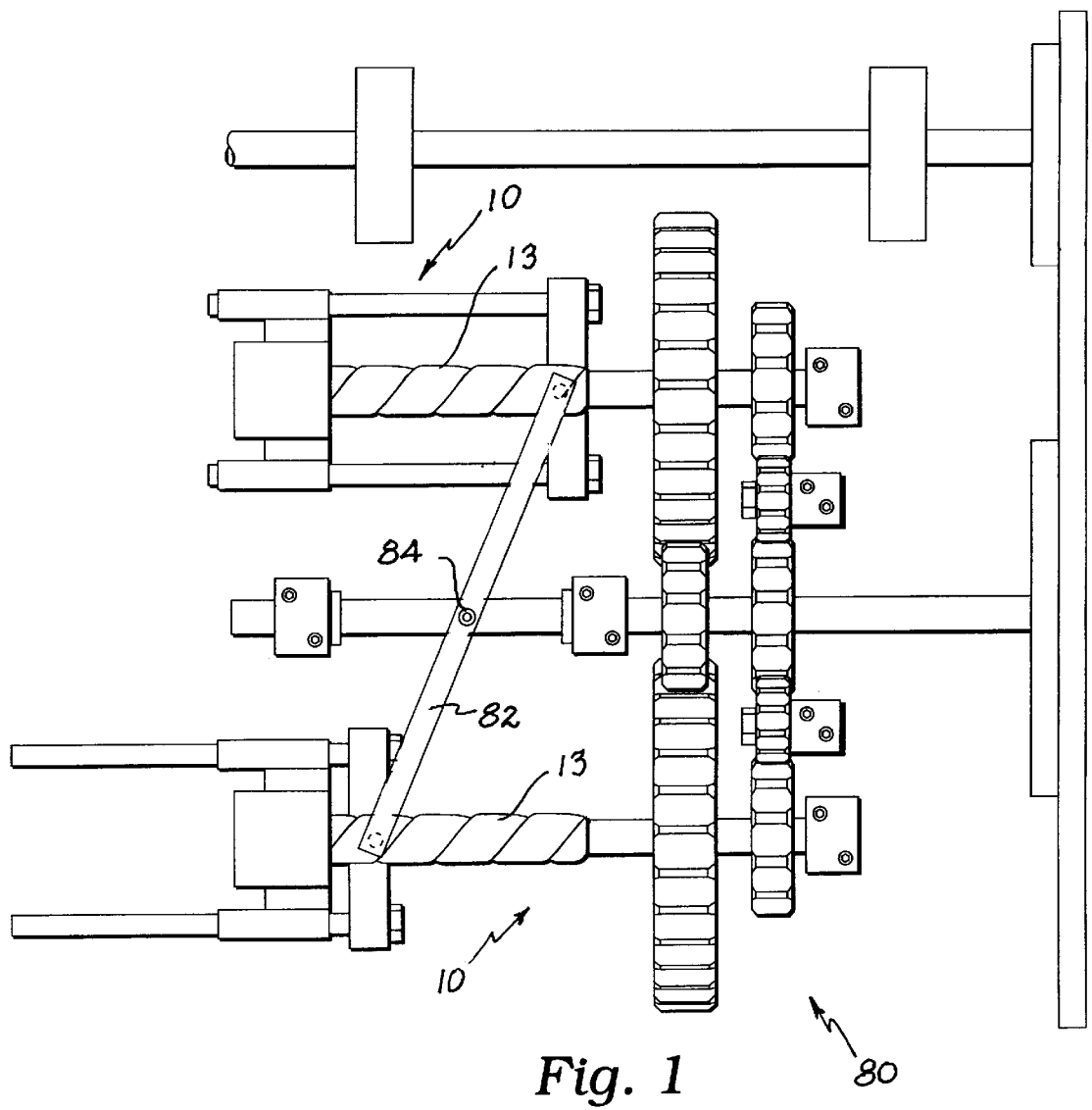
FIG. 1 is a plan view of one embodiment of the present invention for push-pull motion converstion.

Referring to FIG. 1 we define a first embodiment of the present invention utilizing the motion conversion technique of U.S. Pat. No. 4,282,442, (the '442 disclosure). Such motion conversion technique utilizes the dual slip-clutch and gear arrangement of the '442 disclosure which we shall refer to in this application as the "'442 arrangement" and reference numeral 80, and by which we shall mean, and refer to FIGS. 1–5 and its respective detailed description found in the '442 disclosure. In this first embodiment a dual, side-by-side drive arrangement is shown. Toggle shaft means 82 joins input members 13 in a push-pull arrangement about pivot pin 84 so that when one of the drive shafts of drive shaft means 10 is rotated clockwise the other drive shaft of drive shaft means 10 is rotated counterclockwise and visaversa. Therefore, continuous driving by both shafts is provided. A modified (extended) version of the '442 arrangement 80 is utilized in present FIG. 1 as will be understood by one of skill in the art, and teaches the principles involved therein for rotational motion transfer to a flywheel or other driven device.

Figure 2:
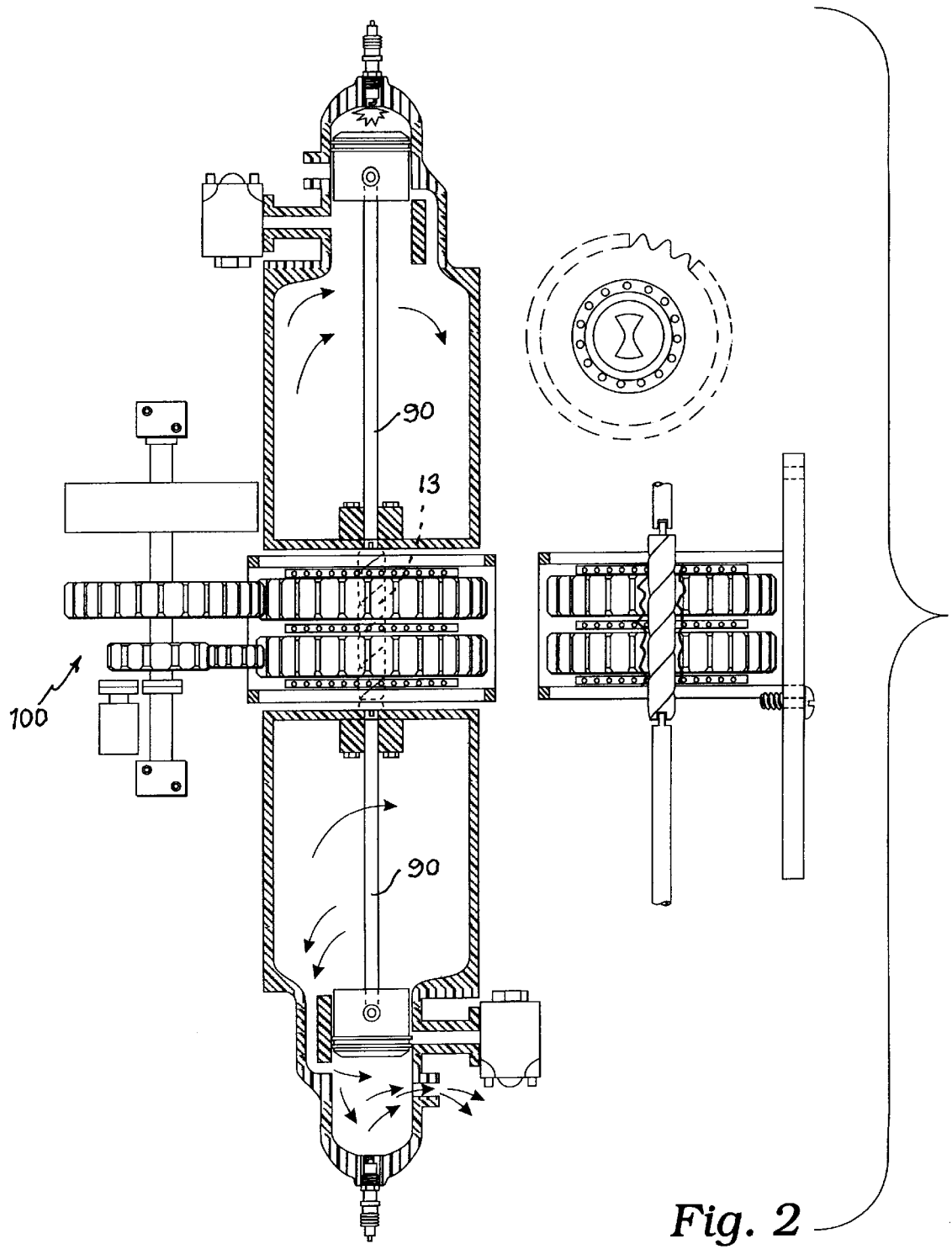
FIG. 2 is a schematic diagram of a further embodiment of the present invention teaching use with a piston engine.
Figures 3, 4:
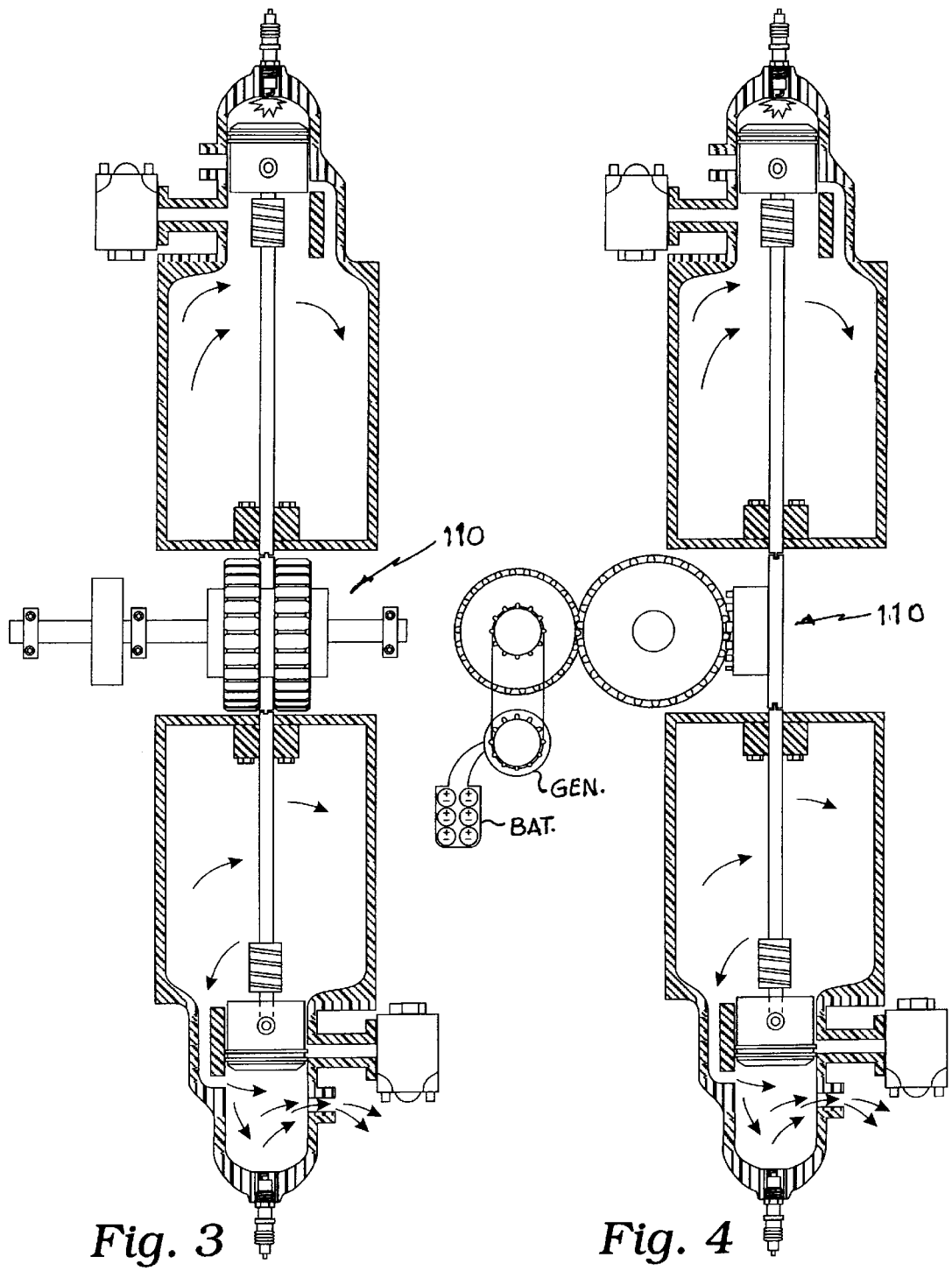
FIG. 3 is a schematic diagram of a still further embodiment of the present invention teaching an alternate use with a piston engine.
FIG. 4 is a side view of the embodiment of FIG. 3.
Figure 5:
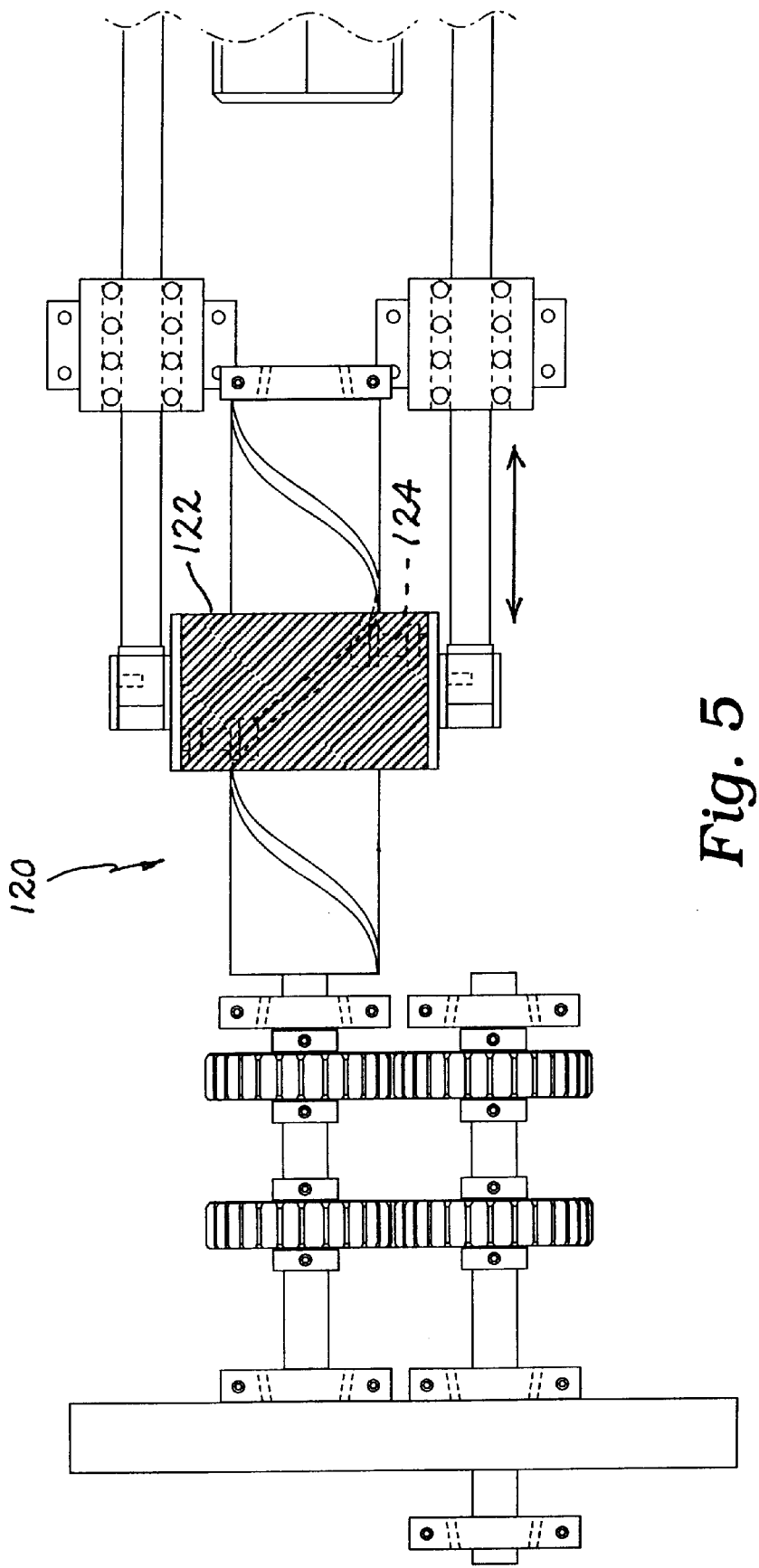
FIG. 5 is a side elevational view of a motion converting device of the invention.

Referring now to FIG. 2, we find a further embodiment of the present invention whereby opposing piston driven rods 90 are arranged for moving in reciprocating linear motion for driving the '442 arrangement 80 or a modified version thereof as is within the range of skill of those practicing in the art, so that drive energy is taken off at a lateral position 100. In FIG. 3 a similar result is accomplished by using a rack and pinion arrangement 110 to receive reciprocating rotational motion from the piston rods 90 and then converting such to a pure rotational motion through the '442 arrangement 80 or any modification thereof within the ability of one of skill in the art.

A linear motion converter means 120 comprises a hollow shaft 122 providing therewithin a spiral groove follower means 124 such that the hollow shaft 122 is enabled for alternating rotational motion as driven by the grooved drive shafts defined in the '442 disclosure. When gears with slip clutches are mounted onto such a hollow shaft 122 the converter means 120 is useful with the '442 arrangement 80 for application in the present invention.

Figure 6:
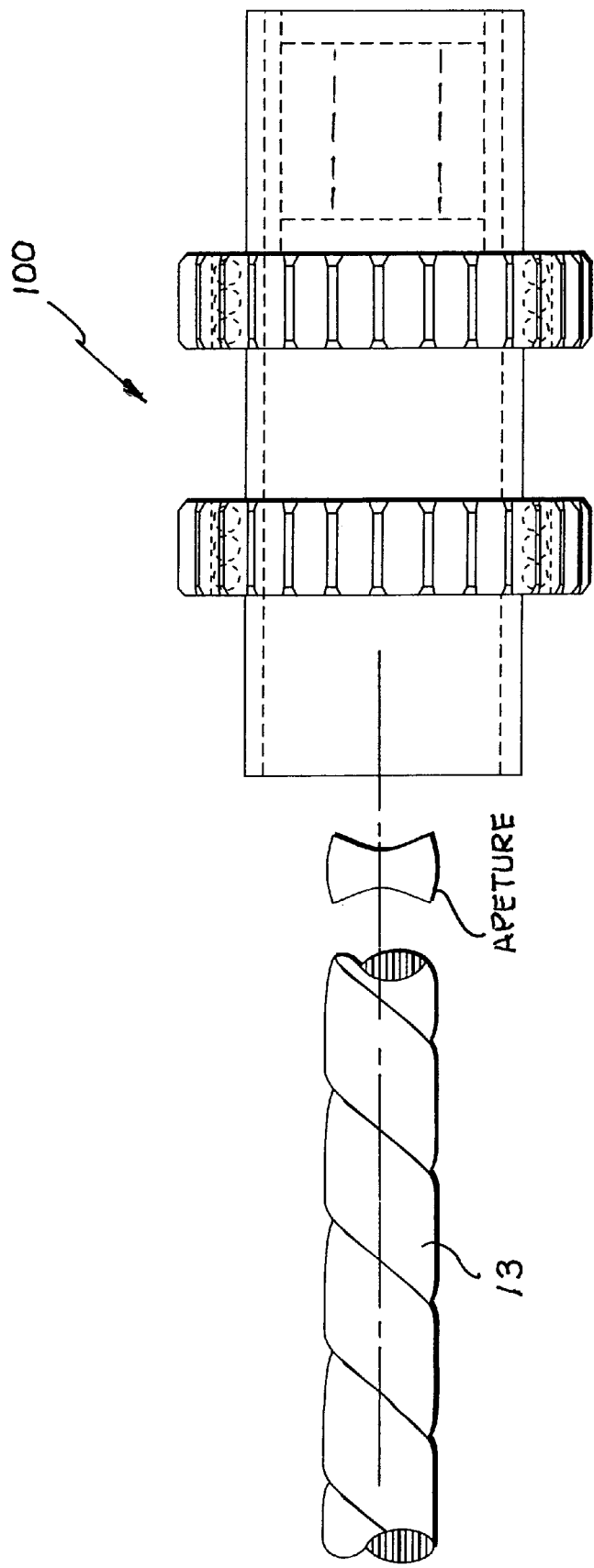
FIG. 6 is a side elevational view of a motion converting adapter using a hollow rod.
Figure 7:
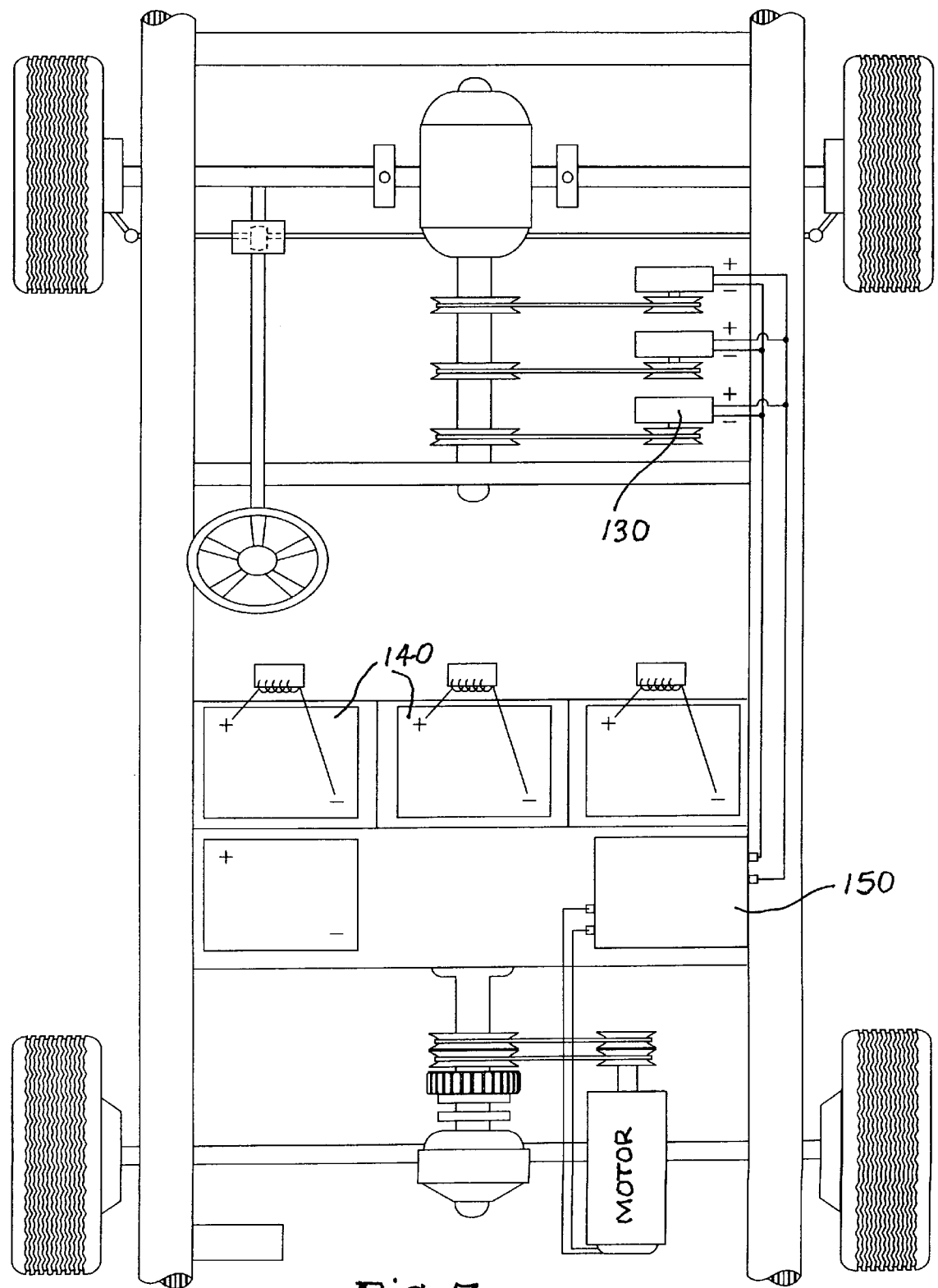
FIG. 7 is a plan view of the present invention showing a possible application as might be utilized in a vehicle.

It should be noted, as shown in FIG. 6, that the present invention is adaptable to the requirements of a land or other vehicle. To accomplish this, the invention further comprises an electrical current producing means 130 such as an alternator, or electrical generator, which is preferably engaged with the output shaft of the motion converting apparatus herein described, and an electricity storage means 140, such as a storage battery, joined with the electrical current producing means 130 for receiving an electrical charge therefrom. Further, the present invention is preferably adapted with an electrical inverter 150 for converting electrical charge within the storage means into an alternating output voltage.

It should be understood that although specific embodiments of the invention have been described herein in detail, such description is for purposes of illustration only and modifications may be made thereto by those skilled in the art within the scope of the invention.

What is claimed is:

1. A device for converting reciprocal linear motion to continuous rotary motion of an output shaft, the device comprising:

a pair of collinear input members jointly movable in a reciprocal linear motion and having a forward stroke in a first linear direction and a backward stroke in a second linear direction opposite said first linear direction;

drive member means rotatable in a first direction and a second direction opposite said first direction;

linear motion converter means for rotating said drive member means in an alternating rotary motion, said converter means rotating said drive member means in said first direction in response to movement of either of said input members in said first linear direction and rotating said drive member means in said second direction in response to movement of either of said input members in said linear direction opposite the first linear direction;

a first gear means coupled to said drive member means by a first one-way clutch means, said first clutch means engaging and rotating said first gear means when the drive member means is rotated in said first direction and disengaging and slipping with respect to said drive member means when said drive member means is rotated in said second direction;

a second gear means coupled to said drive member means by a second one-way clutch means, said second clutch means disengaging and slipping with respect to said drive member means when said drive member is rotated in said first direction and engaging and rotating said second gear when said drive member means is rotated in said second direction;

driven shaft means rotatable in one direction, said driven shaft means having mounted thereon flywheel means for stabilizing the rotational speed of said driven shaft means and for storing energy;

a third gear means connecting both said first and said second gear means to one of said driven shaft means and said output shaft, and connecting the other of said driven shaft means and said output shaft to only said first gear means, to provide for rotation of said driven shaft means, said output shaft and said flywheel and for returning the stored energy from the flywheel to the output shaft thereby reducing the amount of input energy needed to rotate the output shaft; and each of the colinear input members engaged and driven by a two-cycle reciprocating machine adapted for push-pull cooperative motion.

2. The device of claim 1 wherein the two-cycle machine is a two-cycle internal combustion engine with opposing cylinders.

3. The device of claim 1 wherein the linear motion converter means comprises a hollow shaft providing therewithin a spiral groove follower means such that the hollow shaft is enabled for alternating rotational motion.

4. The device of claim 2 further comprising an electrical current producing means engaged with the output shaft, an electricity storage means joined with the electrical current producing means for receiving an electrical charge therefrom.

5. The device of claim 4 further comprising an inverter for converting electrical charge within the storage means into an alternating output voltage.

\* \* \* \* \*